(12) United States Patent
Fontvieille

(10) Patent No.: US 8,571,818 B2
(45) Date of Patent: Oct. 29, 2013

(54) METHOD OF DYNAMICALLY ESTIMATING THE FRESH AIR FLOW RATE SUPPLIED TO AN ENGINE WITH HIGH-PRESSURE AND LOW-PRESSURE EGR CIRCUITS

(75) Inventor: Laurent Fontvieille, Gif sur Yvette (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 370 days.

(21) Appl. No.: 13/121,697

(22) PCT Filed: Sep. 30, 2009

(86) PCT No.: PCT/FR2009/051863
§ 371 (c)(1),
(2), (4) Date: Mar. 30, 2011

(87) PCT Pub. No.: WO2010/049615
PCT Pub. Date: May 6, 2010

(65) Prior Publication Data
US 2011/0307193 A1   Dec. 15, 2011

(30) Foreign Application Priority Data
Oct. 30, 2008   (FR) ...................................... 08 06028

(51) Int. Cl.
*G06F 19/00*   (2011.01)
(52) U.S. Cl.
USPC .......................................................... 702/47
(58) Field of Classification Search
USPC .......................................................... 702/47
See application file for complete search history.

(56) References Cited

U.S. PATENT DOCUMENTS

| 2002/0179060 | A1  | 12/2002 | Engel et al. |
| 2004/0065303 | A1* | 4/2004  | Russell et al. ................ 123/480 |
| 2005/0274369 | A1  | 12/2005 | Tonetti et al. |
| 2010/0307231 | A1* | 12/2010 | Allard et al. ............... 73/114.74 |

FOREIGN PATENT DOCUMENTS

| DE | 100 17 280 | 10/2001 |
| DE | 101 58 249 | 7/2003 |
| EP | 1 607 606 | 12/2005 |
| EP | 1 705 354 | 9/2006 |
| FR | 2 910 929 | 7/2008 |
| FR | 2 910 934 | 7/2008 |

OTHER PUBLICATIONS

International Search Report issued Dec. 18, 2009 in PCT/FR09/051863 filed on Sep. 30, 2009.

* cited by examiner

*Primary Examiner* — Bryan Bui
(74) *Attorney, Agent, or Firm* — Oblon, Spivak, McClelland, Maier & Neustadt, L.L.P.

(57) ABSTRACT

A method of estimating fresh air flow rate entering an engine, for example a diesel engine, supercharged by a turbocharger, including at least one intake manifold of a volume, an exchanger, an air filter, a high-pressure EGR circuit, a low-pressure EGR circuit, an inlet butterfly, an exhaust butterfly, a flow meter, a pressure sensor, a temperature sensor, and a pipe between the flow meter and the inlet of the intake manifold. The method measures temperature, pressure and fresh air flow rate through the flow meter, calculates the engine flow rate, calculates the mass of gas between the flow meter and the inlet to the intake manifold, calculates the mass of gas in the manifold, measures or estimates the high-pressure EGR flow rate, calculates the flow rate of gas through the manifold, calculates the level of low-pressure EGR at the inlet manifold, calculates the mass of air between the flow meter and the inlet to the manifold, calculates the estimated level of EGR, and estimates the dynamic air flow rate from the engine flow rate and from the level of EGR at the inlet to the engine.

9 Claims, 5 Drawing Sheets

METHOD OF DYNAMICALLY ESTIMATING THE FRESH AIR FLOW RATE SUPPLIED TO AN ENGINE WITH HIGH-PRESSURE AND LOW-PRESSURE EGR CIRCUITS

BACKGROUND OF THE INVENTION

1. Field of the Invention

The present invention relates to the field of command and control of the internal combustion engines of motor vehicles turbocharged by means of a turbocharger. Command and control is the technique for managing an internal combustion engine with all of its sensors and actuators. All the laws of command and control and the parameters for characterizing an engine are contained in a computer called the "electronic control unit" or ECU.

2. Dissussion of the Background

The invention proposes a dynamic method for estimating, with the aid of an air flow meter, the flow rate of cool air supplied to an engine, notably a diesel engine, provided with two exhaust gas recirculation (EGR) circuits. One of the circuits is called the "low-pressure circuit" or LP circuit and the other is called the "high-pressure circuit" or HP circuit.

Currently, the tightening of the standards governing the emissions of pollutant gases at the exhaust of a vehicle requires a considerable reduction in nitrogen oxide emissions. The search for technical solutions making it possible to reduce these emissions has therefore become an issue for automobile manufacturers.

The engine considered in the present invention comprises an engine block furnished with cylinders, an intake manifold for taking in cool oxidant and an exhaust manifold for the burnt gases. The branches of the intake and exhaust manifolds are connected to each of the cylinders.

A turbocharger is situated at the outlet and at the inlet of the engine block. The turbocharger consists of a turbine placed at the outlet of the exhaust manifold of the engine and a compressor placed at the inlet of the intake manifold of the engine. The turbine set in motion by the hot gases originating from the combustion drives the compressor so that it compresses cool air also called intake gas, this cool air moving in the intake manifold of the engine in order to supply, via a heat exchanger device, the combustion chamber of each of the cylinders for the purpose of a combustion of a subsequent operating cycle. In this manner, the work supplied by the exhaust gases is transmitted to the intake gases. The cool air is brought to the turbine of the turbocharger via an air filter. The exhaust gases are discharged via a particle filter.

The particle filter makes it possible to reduce the quantity of particles discharged into the atmosphere. It consists of a set of microchannels in which a large proportion of the particles are trapped. When the filter is full of particles, the filter must be emptied by burning of the particles. This phase is called regeneration. Regeneration can be obtained either by a heating device, or by specific adjustments of the engine.

The quantity of nitrogen oxides produced by a diesel engine is linked to a great extent to the composition of the reactant mixture in air, in fuel and to the presence of inert gases in the engine cylinders. These inert gases play no part in the combustion and come from a circuit diverting a portion of the exhaust gases to the intake circuit. The circuit that allows the recirculation of the exhaust gases is called the EGR circuit. EGR is provided by placing the exhaust circuit in communication with the intake circuit via a passageway section the dimension of which is regulated by a valve called the EGR valve.

The HP EGR circuit is called "high pressure" because it is inside the turbocharging circuit. Specifically, a bypass duct makes the exhaust manifold communicate before the turbine of the turbocharger with the intake manifold after the turbocharger compressor via a cooling device. This duct is furnished with a valve for regulating the flow rate called the HP EGR valve which makes it possible to regulate the dimension of the flow rate. An intake butterfly valve is situated downstream of the heat exchange device and upstream of the connection of the bypass duct with the intake manifold in order to increase the pressure difference in the HP EGR circuit and hence increase the rate of recycled exhaust gases, or EGR rate, recycled by the HP EGR circuit. This circuit is used on all diesel engines meeting the EURO IV clean air standard.

The LP EGR circuit is called "low pressure" because it is outside the turbocharging circuit. Specifically, a bypass duct makes the exhaust circuit downstream of the particle filter communicate with the cool air intake circuit upstream of the turbocharger turbine via a cooling device. This duct is furnished with a flow-rate regulating valve called the LP EGR valve which makes it possible to regulate the dimension of the duct. An exhaust butterfly valve is situated downstream of the particle filter and of the connection of the bypass duct with the exhaust circuit in order to increase the pressure difference in the HP EGR circuit and hence to increase the LP EGR rate.

All of the LP and HP EGR gases make it possible to lower the quantity of nitrogen oxides but risk increasing the smoke if the EGR rate is too high. It is therefore fundamental to compute the exact quantity necessary of total HP and LP EGR gas. Moreover, by modulating the proportion of hot LP EGR gases and of cold LP EGR gases, the two EGR circuits make it possible to control the thermics of the gases taken into the engine in order to reduce the hydrocarbon and carbon monoxide emissions and to control the fuel autoignition delay time.

The cool air flow rate information makes it possible to control, on the one hand, the total HP and LP EGR flow rate by regulating the HP EGR valve, the LP EGR valve, the intake butterfly valve and the exhaust butterfly valve and, on the other hand, the cool air flow rate to a setpoint contained in the ECU. It also makes it possible to limit the quantity of fuel injected into the engine in order to prevent too high particle emissions.

When the driver wants maximum power from the engine, on acceleration, the "foot to the floor" position of the accelerator pedal is converted by the ECU into a fuel flow rate setpoint and the HP and LP EGR valves are closed. This fuel flow rate setpoint is limited in transient by a threshold that is a function of the cool air flow rate and of the engine speed. This device makes it possible to limit the particles present in the exhaust gases of the engine during the transients and limits the filling speed of the particle filter. This limitation is called the "smoke limitation". If the flow rate value supplied by the flow meter is used directly by the smoke limitation, no account is taken of the time for emptying the HP and LP EGR gas intake circuit. Consequently, it is necessary to have a cool air flow rate value at the engine inlet in order to correctly limit the smoke in transient.

In order to reduce the pollutant emissions, it is necessary to precisely control the total EGR rate at the engine inlet. This control is carried out mainly with the aid of the cool air flow rate measurement. However, since this measurement is taken upstream of the engine intake circuit, it does not take account of the dynamics of this cool air flow rate. Consequently, it is also necessary to have a cool air flow rate value at the engine inlet in order to correctly limit the total EGR smoke at the engine inlet.

Knowing the cool air flow rate information is therefore fundamental.

Solutions exist but are not sufficiently satisfactory.

Patent application FR 2 910 929 proposes an estimation of the air flow rate entering an engine fitted with two circuits, HP and LP EGR circuits, without the aid of a flow meter. However, this solution is clumsy to apply. It is also sensitive and not very robust with respect to the dispersions over all of the sensors used for this estimation.

Another solution is described in patent FR 2 789 731 in which a method is proposed for estimating the cool air flow rate based on the engine speed, the pressure and the temperature of air in the intake manifold and an estimate of the HP EGR flow rate with the aid of the position of the valve and of applying the formula of Barré de Saint-Venant. However, this solution is no longer valid in the presence of a variable back-pressure at the exhaust, for example, when a variable-geometry turbocharger or a particle filter is used.

Patent application FR 2 824 596 offers an improvement on the solution proposed in patent application FR 2 789 731 by taking account of the pressure difference at the limits of the HP EGR valve when the formula of Barré de Saint-Venant is applied. The main drawback is the great sensitivity of the model when the pressures at the limits of the EGR valve are very similar, which represents most of the operating points.

Patent applications FR 2 833 648, FR 2 833 649 and EP1 024 262 A2 propose a method for estimating the HP EGR flow rate by using the formula of Barré de Saint-Venant followed by the cool air flow rate by deducting the HP EGR flow rate from the total quantity accepted. The resulting cool air flow rate is filtered by the use of a monitoring element checking the pressure in the manifold. The same drawback is found as for patent application FR 2 824 596.

U.S. Pat. Nos. 5,270,935 and 5,273,019 describe a method for estimating the air flow rate entering the engine by making a comparison between a pressure value in the manifold estimated by a parametric model and the value of this measured pressure. The difference between the measurement and the estimate of the pressure in the manifold is combined with a set of correction coefficients optimized to recompute both the pressure in the manifold and the air flow rate.

U.S. Pat. No. 5,273,019 makes it possible to determine the incoming HP EGR flow rate by estimating the partial air pressure in the manifold using the same method as the patents above. The solutions proposed by these patents are difficult to apply in industrial computers because, on the one hand, of the difficulty of their integration associated with the required memory and, on the other hand, with the considerable computation time necessary.

No element of this prior art is compatible with an engine fitted with two EGR circuits, one LP and the other HP, and the use of an air flow meter.

The object of the present invention is to alleviate one or more drawbacks of the prior art and to propose a dynamic method for estimating the cool air flow rate entering an engine fitted with two EGR circuits, one being an HP EGR and the other an LP EGR circuit, with the aid of an air flow meter situated in the intake circuit upstream of the turbocharger and of the connection of the bypass duct of the LP EGR circuit.

According to the invention, the method for estimating the dynamic flow rate of cool air entering an engine, particularly a diesel engine, turbocharged by a turbocharger, fitted at least with an intake manifold, with an exchanger, with an air filter, with an HP EGR circuit, with an LP EGR circuit, with an intake butterfly valve control, with an exhaust butterfly valve control, with a flow meter, with a pressure sensor and a temperature sensor connected to an ECU is characterized in that it comprises the following steps:

measurement of the temperature after the exchanger by the temperature sensor, of the pressure in the manifold by the pressure sensor and of the flow rate of cool air by the flow meter, computation by the ECU of the engine flow rate based on the measurement of the temperature after the exchanger and of the pressure in the manifold, computation by the ECU of the mass of gas between the flow meter and the inlet of the manifold based on the measurement of the temperature after the exchanger and of the pressure in the manifold, computation by the ECU of the mass of gas in the manifold based on the measurement of the temperature after the exchanger and of the pressure in the manifold, measurement or estimation of the HP EGR flow rate, computation by the ECU of the gas flow rate in the manifold based on the engine flow rate and on the mass of gas in the manifold;

estimation by the ECU of the rate of LP EGR at the inlet of the manifold based on the mass of gas between the flow meter and the manifold inlet, on the flow rate of gas in the manifold and on the cool air flow rate measured by the flow meter;

computation by the ECU of the mass of air between the flow meter and the manifold inlet based on the LP EGR rate at the inlet of the manifold and on the flow rate of cool air measured by the flow meter;

estimation by the ECU of the EGR rate at the engine inlet based on the mass of air between the flow meter and the inlet of the manifold, on the mass in the manifold and on the flow rate of cool air measured by the flow meter, estimation by the ECU of the dynamic engine air flow rate based on the engine flow rate and on the EGR rate at the engine inlet.

According to another particular feature, the cool air flow rate is estimated by taking account of the following items of information:

detection of the aperture of the intake butterfly valve;

temperature in the whole intake circuit considered to be equal to the temperature $T_{ape}$ after the exchanger;

mass of gas between the flow meter and the inlet of the manifold estimated by an algorithm using the following formula:

$$M_{cool} = \frac{P_{coll} \cdot V_{cool}}{R \cdot T_{ape}},$$

where $P_{coll}$=pressure measured in the manifold, $V_{cool}$=volume of gas between the flow meter and the manifold inlet, $T_{ape}$=temperature measured after the exchanger and R is the individual constant of the air;

mass of gas in the manifold estimated by an algorithm using the following formula $$M_{coll} = \frac{P_{coll} \cdot V_{coll}}{R \cdot T_{ape}}$$

where $V_{coll}$=volume of the manifold;

the HP EGR flow rate $Q_{EGR\_HP\_coll}$ entering the manifold is provided by the ECU by measurement or estimation.

According to another particular feature, the estimation method is characterized in that it uses the following operations:

determination of the flow rate $Q_{mot}$ of gas that has entered the engine $$Q_{mot} = 3600 \times \left[ \frac{P_{coll}}{R \cdot T_{ape}} \frac{V_{cyl}}{2} \frac{N}{60} \eta_r \left( N, \frac{P_{coll}}{R \cdot T_{ape}} \right) \right]$$

where $V_{cyl}$=cubic inch displacement of the engine, N=engine rotation speed, $P_{coll}$=pressure measured in the manifold, $T_{ape}$=temperature measured after the exchanger, $\eta_r$=volumetric efficiency of the engine and R=individual constant of the air computation by the ECU of the EGR rate in the engine $$\tau_{EGR\_mot} = \frac{M_{EGR\_coll}}{M_{EGR\_coll} + M_{air\_coll}} = \frac{Q_{EGR\_mot}}{Q_{EGR\_mot} + Q_{air\_mot}}$$

where $T_{EGR\_mot}$=EGR rate at the engine inlet, $M_{EGR\_coll}$=mass of the HP EGR gases in the volume of the manifold, $M_{air\_coll}$=mass of the air in the volume of the manifold, $Q_{EGR\_mot}$=HP and LP EGR flow rate entering the engine, $Q_{air\_mot}$=air flow rate entering the engine computation by the ECU of the LP EGR rate at the manifold inlet $$\tau_{EGR\_BP\_coll} = \frac{M_{EGR\_BP\_cool}}{M_{EGR\_BP\_cool} + M_{air\_cool}} = \frac{Q_{EGR\_BP\_coll}}{Q_{EGR\_BP\_coll} + Q_{air\_coll}}$$

where $\tau_{EGR\_BP\_Coll}$=LP EGR rate at the manifold inlet, $M_{EGR\_BP\_cool}$=mass of the LP EGR gases between the flow meter and the manifold inlet, $M_{air\_cool}$=mass of the air between the flow meter and the manifold inlet, $Q_{EGR\_BP\_coll}$=LP EGR flow rate entering the manifold, $Q_{air\_coll}$=air flow rate entering the manifold, control of the butterfly valves in order to retain the mass in the manifold $$\begin{cases} \frac{dM_{air\_coll}}{dt} = Q_{air\_coll} - Q_{air\_mot} \\ \frac{dM_{EGR\_coll}}{dt} = Q_{EGR\_coll} - Q_{EGR\_mot} \end{cases}$$

and determination of the latter by applying a computation algorithm using the following equation $$\frac{dM_{coll}}{dt} = Q_{air\_coll} + Q_{EGR\_coll} - Q_{mot}$$

where $Q_{mot}=Q_{air\_mot}+Q_{EGR\_mot}$ and $M_{coll}=M_{air\_coll}+M_{EGR\_coll}$.

control of the butterfly valves to retain the mass in the exchanger $$\begin{cases} \frac{dM_{air\_cool}}{dt} = Q_{débitmètre} - Q_{air\_coll} \\ \frac{dM_{EGR\_BP\_cool}}{dt} = Q_{EGR\_BP\_dyn} - Q_{EGR\_BP\_coll} \end{cases}$$

and determination of the latter by the application of a computation algorithm using the following equation $$\frac{dM_{cool}}{dt} = Q_{débitmètre} + Q_{EGR\_BP\_dyn} - Q_{coll}$$

where $Q_{coll}=Q_{air\_coll}+Q_{EGR\_BP\_coll}$ and $M_{cool}=M_{air\_cool}+M_{EGR\_BP\_cool}$ based on which the ECU estimates the LP EGR and engine EGR rates:

by applying a differential equation for estimating the LP EGR rate at the manifold inlet $$\frac{d\hat{\tau}_{EGR\_BP\_coll}}{dt} = \frac{1}{M_{cool}} \cdot \left[ (1 - \hat{\tau}_{EGR\_BP\_coll}) \cdot \left( Q_{coll} + \frac{dM_{cool}}{dt} \right) - Q_{débitmètre} \right]$$

and a differential equation for estimating the engine EGR rate $$\frac{d\hat{\tau}_{EGR\_mot}}{dt} =$$

$$\frac{1}{M_{coll}} \cdot \left[ (1 - \hat{\tau}_{EGR\_mot}) \cdot \left( Q_{mot} + \frac{dM_{coll}}{dt} \right) + \frac{dM_{air\_cool}}{dt} - Q_{débitmètre} \right]$$

According to one embodiment, the differential equations in EGR rate are resolved discretely:

$$\hat{\tau}_{EGR\_BP\_coll} =$$

$$\frac{1}{M_{cool}} \cdot \sum \left[ (1 - \hat{\tau}_{EGR\_BP\_coll_{n-1}}) \cdot \left( Q_{coll} + \frac{dM_{cool}}{dt} \right) - Q_{débitmètre} \right] \text{ and}$$

$$\hat{\tau}_{EGR\_mot} =$$

$$\frac{1}{M_{coll}} \cdot \sum \left[ (1 - \hat{\tau}_{EGR\_mot_{n-1}}) \cdot \left( Q_{mot} + \frac{dM_{coll}}{dt} \right) + \frac{dM_{air\_cool}}{dt} - Q_{débitmètre} \right]$$

According to one embodiment, with no HP EGR circuit, the method for estimating the cool air flow rate entering an engine, notably a diesel engine, turbocharged by a turbocharger, fitted at least with an LP EGR circuit, a flow meter, an intake manifold, an exchanger, an air filter, an intake butterfly valve control, an exhaust butterfly valve control, a pressure sensor and a temperature sensor connected to an ECU is characterized in that it comprises the following steps:

measurement of the temperature after the exchanger by the temperature sensor, of the pressure in the manifold by the pressure sensor and of the flow rate of cool air by the flow meter, computation by the ECU of the engine flow rate based on the measurement of temperature after the exchanger and of the pressure in the manifold, computation by the ECU of the mass of gas in the intake based on the measurement of temperature after the exchanger and of the pressure in the manifold, estimation by the ECU of the LP EGR rate in the engine based on the cool air flow rate measured by the flow meter, on the engine flow rate and on the mass of gas in the intake, estimation by the ECU of the engine air flow rate based on the LP EGR rate and on the engine flow rate.

According to one embodiment with no HP EGR circuit, the cool air flow rate is estimated taking account of the following information:

detection of the aperture of the intake butterfly valve;
temperature in the whole intake circuit considered to be equal to the temperature $T_{ape}$ after the exchanger;
mass of gas between the flow meter and the engine inlet estimated by an algorithm using the following formula:

$$M_{adm} = \frac{P_{coll} \cdot V_{adm}}{R \cdot T_{ape}},$$

where $P_{coll}$=pressure measured in the manifold,
$V_{adm}$=volume of gas between the flow meter and the engine inlet,
$T_{ape}$=temperature measured after the exchanger and R the individual constant of the air.

According to one embodiment with no HP EGR circuit, the estimation method is characterized in that it applies the following operations:

determination of the flow rate $Q_{mot}$ of gas that has entered the engine $$Q_{mot} = \frac{N}{120} \cdot \frac{P_{coll}}{R \cdot T_{ape}} \cdot \eta_r\left(\frac{P_{coll}}{R \cdot T_{ape}}, N\right) \cdot V_{cyl}$$

where $V_{cyl}$=displacement of the engine, N=rotation speed of the engine, $P_{coll}$=pressure measured in the manifold, $T_{ape}$=temperature measured after the exchanger, $\eta_r$=volumetric efficiency of the engine and R=individual constant of the air estimation by the ECU of the LP EGR rate at the engine inlet $$\frac{d\hat{\tau}_{EGR\_BP\_mot}}{dt} = \frac{1}{M_{cool}} \cdot \left[(1 - \hat{\tau}_{EGR\_BP\_coll}) \cdot \left(Q_{mot} + \frac{dM_{adm}}{dt}\right) - Q_{débitmètre}\right]$$

According to one embodiment with no HP EGR, the differential equation in estimated EGR rate is resolved discretely:

$$\hat{\tau}_{EGR\_BP\_mot} = \frac{1}{M_{cool}} \sum \cdot \left[(1 - \hat{\tau}_{EGR\_BP\_mot_{n-1}}) \cdot \left(Q_{mot} + \frac{dM_{adm}}{dt}\right) - Q_{débitmètre}\right]$$

The invention will be better understood and other objects, features, details and advantages of the latter will appear more clearly during the following explanatory description made with reference to the appended figures given as nonlimiting examples in which.

DETAILED DESCRIPTION OF THE PREFERRED EMBODIMENTS

The present invention proposes an estimation of the cool air flow rate entering an engine comprising two EGR circuits.

There are two types of EGR circuits: the HP EGR circuit and the LP EGR circuit.

Figure 1:
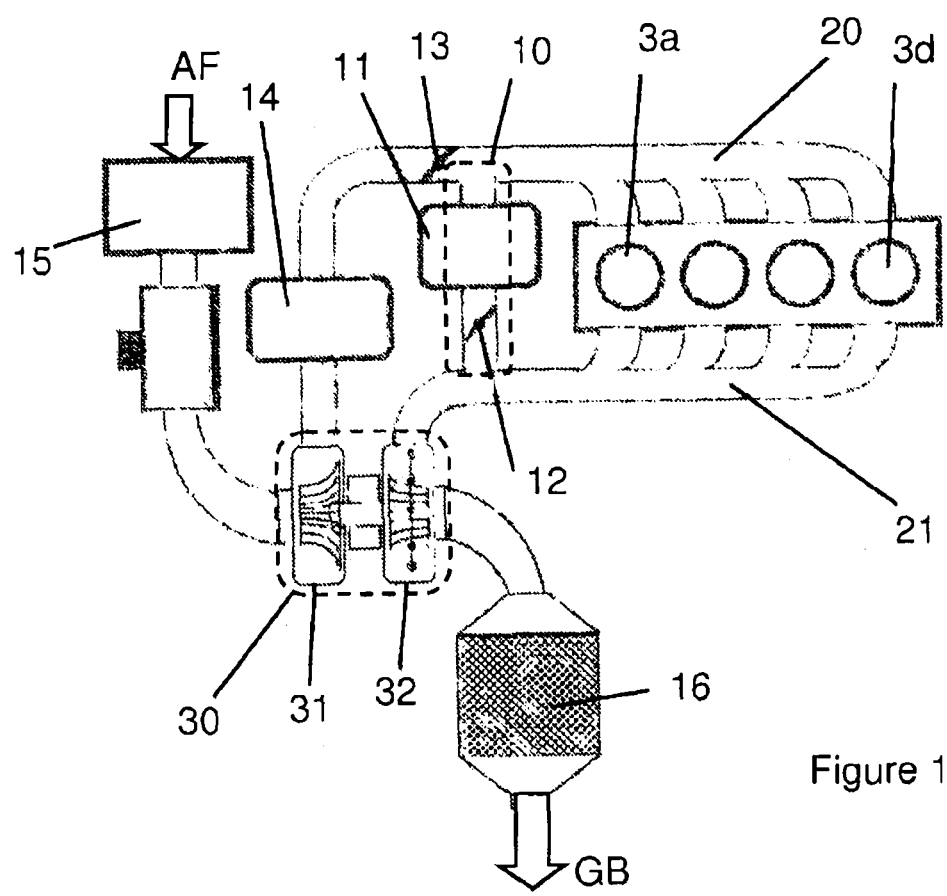
FIG. 1 illustrates a high-pressure exhaust gas recirculation circuit.

FIG. 1 depicts an engine comprising an HP EGR circuit. It consists of an engine block comprising cylinders (3a), (3b), (3c), and (3d), an intake manifold (20) and an exhaust manifold (21). A turbocharger (30) is situated at the outlet and at the inlet of the engine block. It consists of a turbine (32) at the outlet of the exhaust manifold (21) and a compressor (31) at the inlet of the intake manifold (20). A bypass duct (10) makes the exhaust manifold (21) communicate in front of the turbine via a cooling device (11). This duct is furnished with an HP EGR valve (12). An intake butterfly valve (13) is situated downstream of a heat exchange device (14) and upstream of the connection of the bypass duct (10) with the intake manifold (20). The cool air (AF) is brought to the turbine (31) of the turbocharger (30) via an air filter (15). The exhaust gases (GB) are discharged via a particle filter (16).

Figure 2:
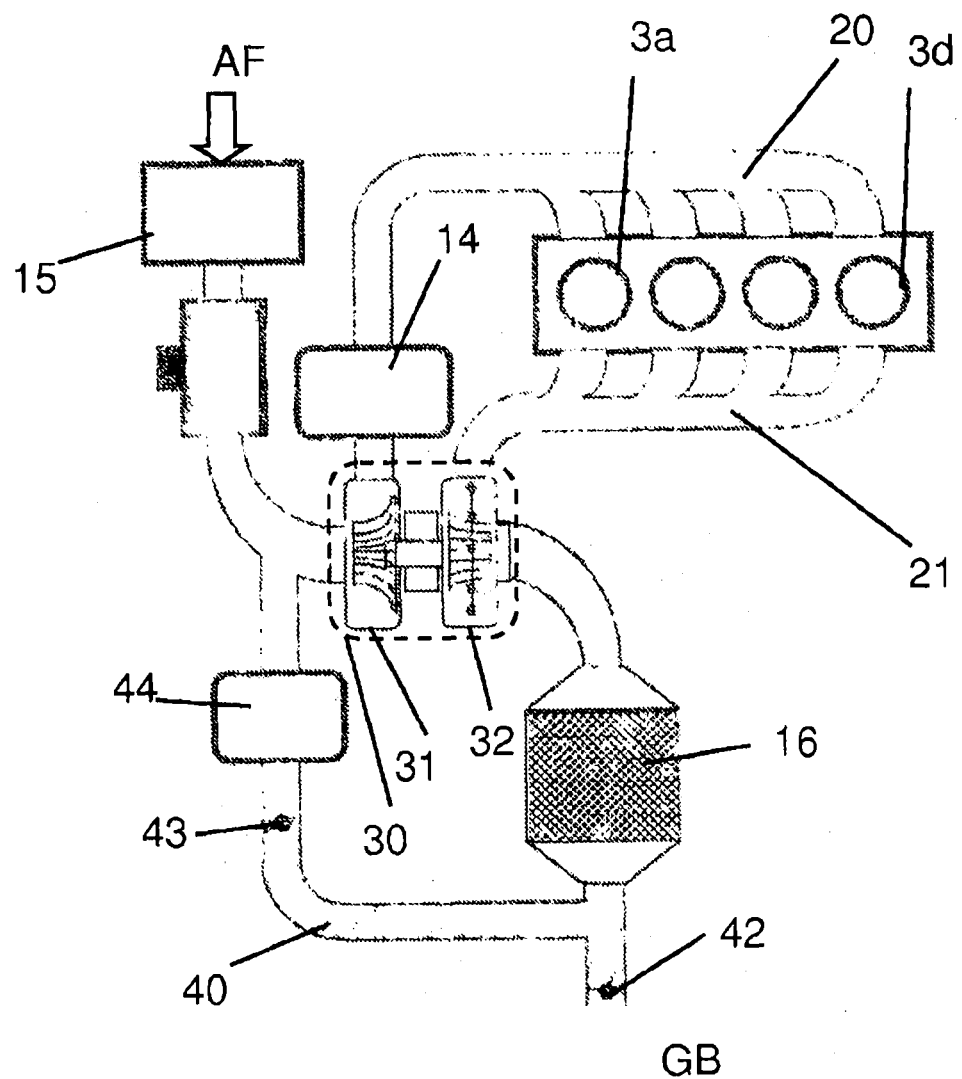
FIG. 2 illustrates a low-pressure exhaust gas recirculation circuit.

FIG. 2 illustrates an engine comprising an LP EGR circuit. The device differs from that described for FIG. 1 in that the bypass duct (40) makes the exhaust circuit (21) communicate downstream of the particle filter (16) with the intake circuit for the cool air (AF) that has been filtered by an air filter (15) upstream of the turbine (31) of the turbocharger (30) via a cooling device (44). This bypass duct (40) is provided with an LP EGR valve (43). An exhaust butterfly valve (42) is situated downstream of the particle filter (16) and of the connection of the bypass duct (40) with the exhaust circuit through which the exhaust gases (GB) are discharged.

Figure 3:
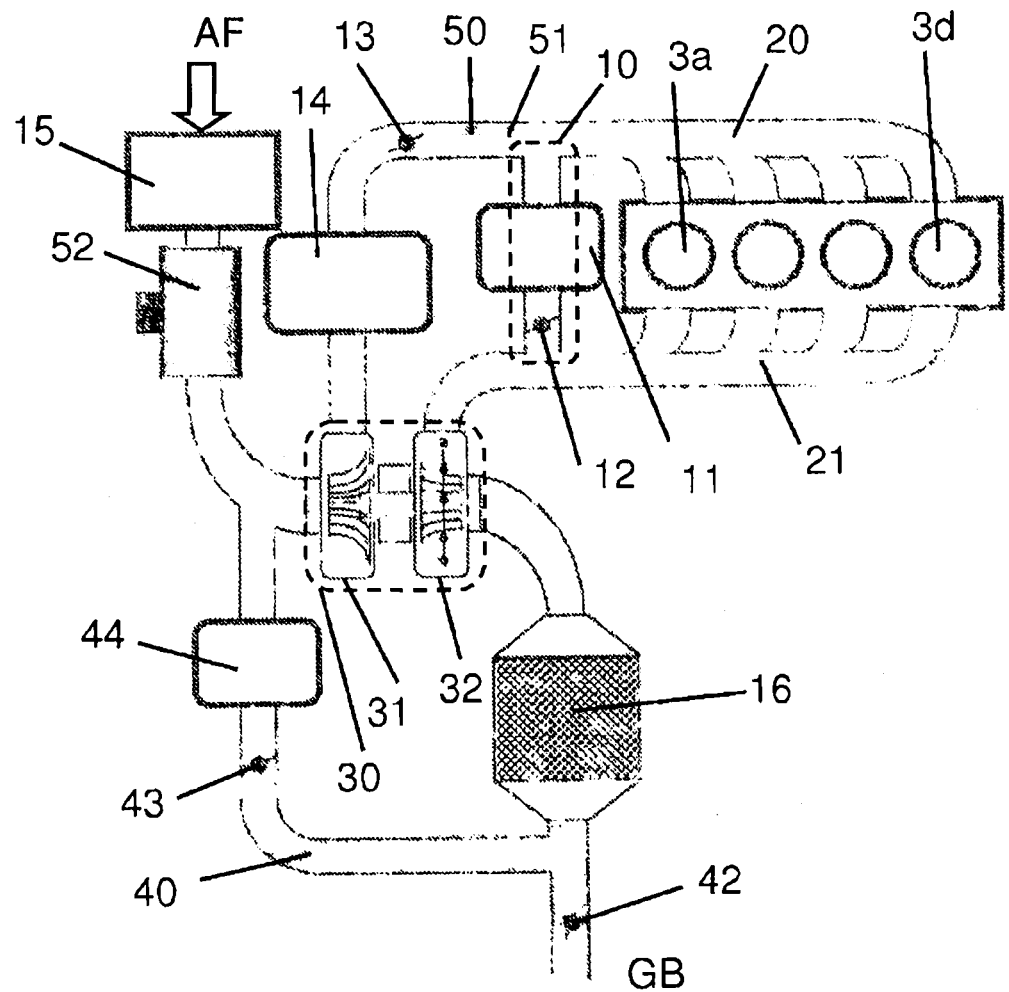
FIG. 3 illustrates the gas recirculation circuit involved in the invention comprising both circuits, HP and LP EGR circuits.

FIG. 3 illustrates an engine comprising both types of EGR circuits: the HP EGR circuit and the LP EGR circuit with the two bypass ducts, the bypass duct (10) for the HP EGR circuit and the bypass duct (40) for the LP EGR circuit. The method for estimating the cool air flow rate requires, at least, a pressure sensor (50) situated between the intake butterfly valve (13) and the connection of the manifold (20) and the HP EGR bypass duct (10), a temperature sensor (51) situated after the exchanger (14) and a flow meter (52) situated in the intake circuit upstream of the turbocharger (30) and downstream of the air filter (15).

Figure 4:
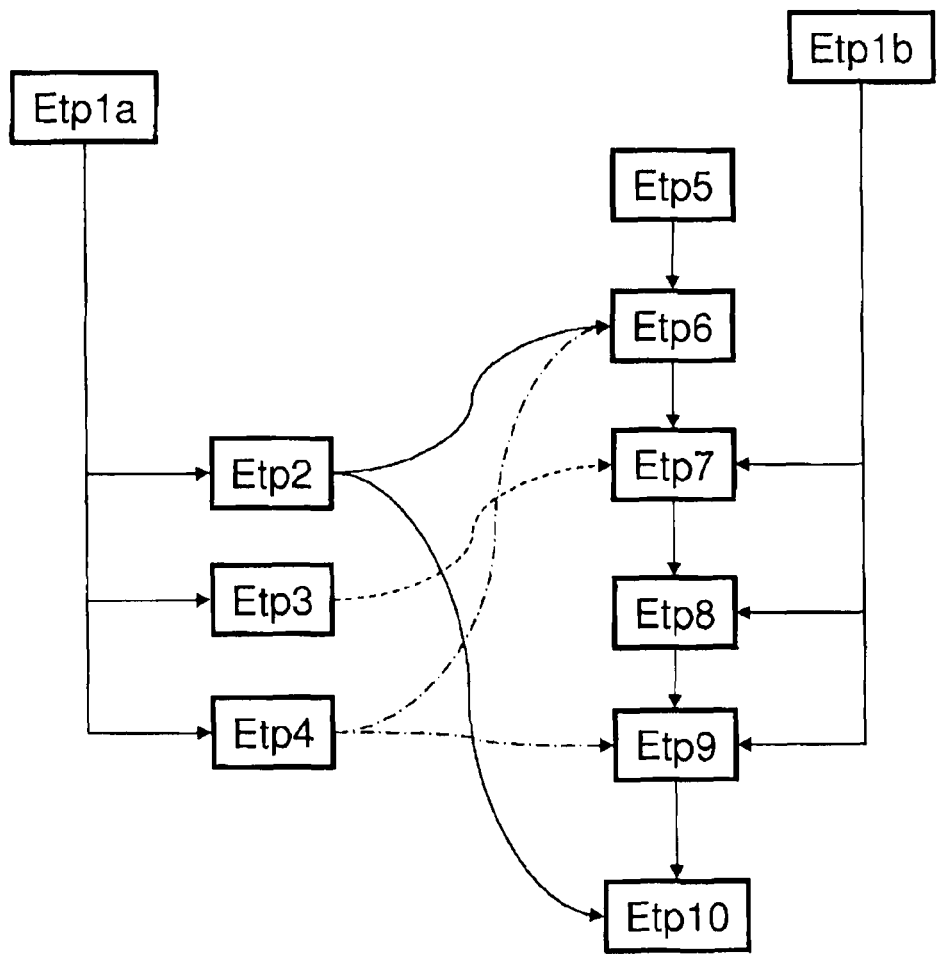
FIG. 4 illustrates the steps of the method for estimating the cool air flow rate entering an engine according to one embodiment comprising both circuits, HP and LP EGR circuits.

FIG. 4 depicts the steps of the estimation method, according to one embodiment, for estimating the cool air flow rate entering an engine fitted with two circuits, an HP EGR circuit and an LP EGR circuit.

Step Etp1a consists of the measurement of the temperature $T_{ape}$ after the exchanger (14) by a temperature sensor (51) and the measurement of the pressure in the manifold $P_{coll}$ by a pressure sensor (50).

The cool air flow rate $Q_{débitmètre}$ is measured by a flow meter (52) in step Etp1b.

$P_{coll}$ and $T_{ape}$ allow the computation the engine flow rate $Q_{mot}$ in step Etp2, the computation of the mass of gas $M_{cool}$ between the flow meter (52) and the inlet of the manifold (20) in step Etp3 and the computation of the mass of gas in the manifold $M_{coll}$ in step Etp4.

The HP EGR flow rate $Q_{EGR\_HP\_coll}$ is measured or estimated in step EtpS.

With the HP EGR flow rate $Q_{EGR\_HP\_coll}$ measured or estimated in step EtpS, the gas flow rate in the manifold $Q_{coll}$ is computed in step Etp6 based on $Q_{mot}$ computed in step Etp2 and $M_{coll}$ computed in step Etp4.

Step Etp7 consists in estimating the LP EGR rate $\hat{\tau}_{EGR\_BP\_coll}$ at the manifold inlet based on $M_{cool}$ computed in step Etp4 and on $Q_{coll}$ computed in step Etp6.

In step Etp8, the mass of air between the flow meter and the manifold inlet $M_{air\_cool}$ is computed based on $\hat{\tau}_{EGR\_BP\_coll}$ estimated in step Etp7 and on $Q_{débitmètre}$ measured in step Etp1b.

In step Etp9, the EGR rate at the engine inlet $\hat{\tau}_{EGR\_mot}$ is estimated based on $M_{air\_cool}$ computed in step Etp8, on $M_{coll}$ computed in step Etp4 and on $Q_{débitmètre}$ measured in step Etp1b.

Finally, in step Etp10, the dynamic air flow rate $Q_{air\_mot}$ is estimated based on $\hat{\tau}_{EGR\_mot}$ computed in step Etp9 and on $Q_{mot}$ computed in step Etp2.

Figure 5:
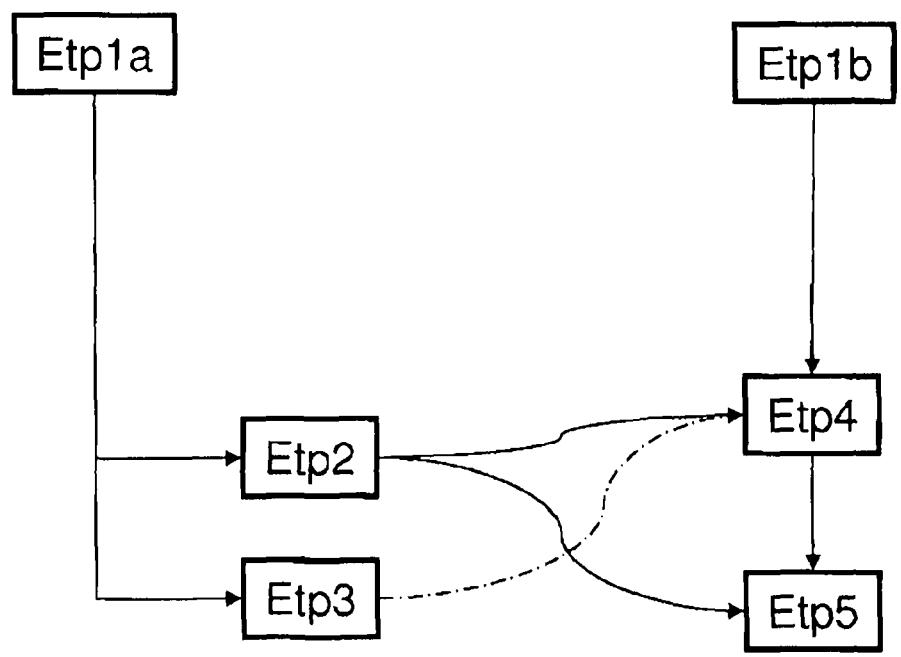
FIG. 5 illustrates the steps of the method for estimating the cool air flow rate entering an engine according to another embodiment comprising the LP EGR circuit only.

FIG. 5 depicts the steps of the estimation method, according to another embodiment, for estimating the cool air flow rate entering an engine fitted with an LP EGR circuit.

Step Etp1a consists in measuring the temperature $T_{ape}$ after the exchanger (14) via a temperature sensor (51) and the pressure in the manifold $P_{coll}$ via a pressure sensor (50).

The cool air flow rate $Q_{débitmètre}$ is measured by a flow meter (52) in step Etp1b.

$P_{coll}$ and $T_{ape}$ make it possible to compute the engine flow rate $Q_{mot}$ in step Etp2 and to compute the mass of gas in the intake $M_{adm}$ in step Etp3.

In step Etp4, the LP EGR rate in the engine $\hat{\tau}_{EGR\_BP\_mot}$ is estimated based on $Q_{mot}$ computed in step Etp2, $M_{adm}$ computed in step Etp3 and $Q_{débitmètre}$ measured in step Etp1b.

Finally, in step Etp5, the dynamic air flow rate $Q_{air\_mot}$ is computed based on $\hat{\tau}_{EGR\_BP\_mot}$ computed in step Etp4 and on $Q_{mot}$ computed in step Etp2.

It should be evident to those versed in the art that the present invention allows embodiments in numerous other specific forms without departing from the field of application of the invention as claimed. Consequently, the present embodiments should be considered as an illustration, but can be modified in the field defined by the scope of the appended claims and the invention should not be limited to the details given above.

List Of Variables $R = 287\ J \cdot kg^{-1} \cdot K^{-1}$: individual constant of the air;

$\eta_v$: volumetric efficiency of the engine expressed as a function of the rotation speed of the engine N and of $$\frac{P_{coll}}{R \cdot T_{ape}};$$

the density of the gases taken in $\hat{\tau}_{EGR\_BP\_mot_{n-1}}$: LP EGR rate estimated at the engine inlet in the above computation step;

$\tau_{EGR\_mot}$: EGR rate at the engine inlet;

$\hat{\tau}_{EGR\_mot}$: estimated EGR rate at the engine inlet;

$\hat{\tau}_{EGR\_mot_{n-1}}$: estimated EGR rate at the engine inlet in the previous computation step;

$\tau_{EGR\_BP\_coll}$: LP EGR rate at the manifold inlet;

$\hat{\tau}_{EGR\_BP\_coll}$: estimated LP EGR rate at the manifold inlet;

$M_{adm}$: mass of gas between the flow meter and the engine inlet in kg;

$M_{air\_coll}$: mass of the air in the volume of the manifold in kg;

$M_{air\_cool}$: mass of the air between the flow meter and the manifold in kg;

$M_{coll} = M_{air\_coll} + M_{EGR\_coll}$: mass of the gases in the volume of the manifold in kg;

$M_{cool} = M_{air\_cool} + M_{EGR\_BP\_cool}$: mass of the gases between the flow meter and the manifold inlet in kg;

$M_{EGR\_BP\_cool}$: mass of the LP EGR gases between the flow meter and the manifold inlet in kg;

$M_{EGR\_coll}$: mass of the HP EGR gases in the volume of the manifold in kg;

N: rotation speed of the engine in revolutions per minute$^{-1}$;

$P_{coll}$: pressure in the manifold in Pa;

$Q_{air\_coll}$: air flow rate entering the manifold in $kg \cdot h^{-1}$;

$Q_{air\_mot}$: cool air flow rate entering the engine in $kg \cdot h^{-1}$;

$\hat{Q}_{air\_mot}$: estimated cool air flow rate entering the engine in $kg \cdot h^{-1}$;

$Q_{coll} = Q_{air\_coll} + Q_{EGR\_BP\_coll}$: gas flow rate in the manifold in $kg \cdot h^{-1}$;

$Q_{débitmètre}$: air flow rate from the flow meter in $kg \cdot h^{-1}$;

$Q_{EGR\_BP\_coll}$: LP EGR flow rate entering the manifold in $kg \cdot h^{-1}$;

$Q_{EGR\_BP\_dyn}$: LP EGR flow rate entering the exchanger in $kg \cdot h^{-1}$;

$Q_{EGR\_coll}$: EGR flow rate entering the manifold in $kg \cdot h^{-1}$;

$Q_{EGR\_mot}$: HP and LP EGR flow rate entering the engine in $kg \cdot h^{-1}$;

$Q_{mot} = Q_{air\_mot} + Q_{EGR\_mot}$: gas flow rate entering the engine $kg \cdot h^{-1}$;

$T_{ape}$: temperature after the exchanger in K;

$V_{adm}$: volume between the flow meter and the engine inlet in $m^3$;

$V_{coll}$: volume of the manifold in $m^3$;

$V_{cool}$: volume between the flow meter and the manifold inlet in $m^3$;

$V_{cyl}$: displacement of the engine in $m^3$.

The invention claimed is:

1. A method for estimating a flow rate of cool air entering an engine, turbocharged by a turbocharger, including an intake manifold of volume $V_{coll}$, an exchanger, an air filter, an HP EGR circuit, an LP EGR circuit, an intake butterfly valve, an exhaust butterfly valve, a flow meter, a pressure sensor, a temperature sensor connected to an electronic control unit, and a duct of volume $V_{cool}$ between the flow meter and the inlet of the intake manifold, the method comprising:

measuring a temperature $T_{ape}$ after the exchanger by the temperature sensor, a pressure in the manifold $P_{coll}$ by the pressure sensor, and a flow rate of cool air $Q_{flowmeter}$ by the flow meter;

computing, by the ECU, an engine flow rate $Q_{mot}$ based on the measurement of the temperature $T_{ape}$ after the exchanger and of the pressure $P_{coll}$ in the intake manifold;

computing, by the ECU, a mass of gas between the flow meter and the inlet of the intake manifold based on the measurement of the temperature $T_{ape}$ after the exchanger and of the pressure $P_{coll}$ in the manifold;

computing, by the ECU, a mass of gas in the manifold based on the measurement of the temperature $T_{ape}$ after the exchanger and of the pressure $P_{coll}$ in the manifold;

measuring or estimating the HP EGR flow rate;

computing, by the ECU, a gas flow rate in the manifold based on the engine flow rate and on the mass of gas in the manifold;

estimating, by the ECU, a rate of LP EGR at the inlet of the manifold based on the mass of gas between the flow meter and the manifold inlet and on the flow rate of gas in the manifold;

computing, by the ECU, a mass of air between the flow meter and the manifold inlet based on the LP EGR rate at the inlet of the manifold and on the flow rate of cool air $Q_{flowmeter}$ measured by the flow meter;

estimating, by the ECU, an EGR rate $\hat{\tau}_{EGR\_mot}$ at the engine inlet based on the mass of air between the flow meter and the inlet of the manifold, on the mass in the manifold and on the flow rate of cool air $Q_{flowmeter}$ measured by the flow meter, estimating, by the ECU, a dynamic engine air flow rate based on the engine flow rate and on the EGR rate at the engine inlet by expression $\hat{Q}_{air\_mot}=(1-\hat{\tau}_{EGR\_mot})Q_{mot}$.

2. The method for estimating the flow rate of cool air entering an engine, as claimed in claim 1, wherein the flow meter is situated after the air filter.

3. The method for estimating the flow rate of cool air entering an engine, as claimed in claim 1, wherein the pressure sensor and the temperature sensor are situated in the manifold after the exchanger and the intake butterfly valve.

4. The method for estimating the flow rate of cool air entering an engine, as claimed in claim 1, wherein the intake butterfly valve is open.

5. The method for estimating the flow rate of cool air entering an engine, as claimed in claim 1, wherein the temperature in the whole intake circuit is considered to be equal to the temperature $T_{ape}$.

6. The method for estimating the flow rate of cool air entering an engine, as claimed in claim 1, wherein the mass of gas between the flow meter and the inlet of the manifold estimated by an algorithm using the following formula:

$$M_{cool} = \frac{P_{coll} \cdot V_{cool}}{R \cdot T_{ape}},$$

wherein R is the individual constant of the air.

7. The method for estimating the flow rate of cool air entering an engine, as claimed in claim 1, wherein the mass of gas in the manifold estimated by an algorithm using the following formula:

$$M_{coll} = \frac{P_{coll} \cdot V_{coll}}{R \cdot T_{ape}},$$

wherein R is the individual constant of the air.

8. The method for estimating the flow rate of cool air entering an engine, as claimed in claim 1, wherein the EGR rates are computed discretely based on differential equations.

9. The method for estimating the flow rate of cool air entering an engine, as claimed in claim 1, adapted for an engine with no HP EGR, and comprising:

measuring the temperature $T_{ape}$ after the exchanger by the temperature sensor, the pressure in the manifold $P_{coll}$ by the pressure sensor, and the flow rate of cool air $Q_{flowmeter}$ by the flow meter;

computing, by the ECU, the engine flow rate $Q_{mot}$ based on the measurement of the temperature $T_{ape}$ after the exchanger and the pressure $P_{coll}$ in the manifold;

computing, by the ECU, the mass in the intake manifold based on the measurement of the temperature $T_{ape}$ after the exchanger and of the pressure $P_{coll}$ in the manifold;

estimating, by the ECU, the LP EGR rate $\hat{\tau}_{EGR\_BP\_mot}$ at the inlet of the manifold based on the mass of gas in the intake manifold, on the flow rate of gas in the intake manifold and on the flow rate of cool air $Q_{flowmeter}$ measured by the flow meter;

estimating, by the ECU, the dynamic engine air flow rate based on the engine flow rate and on the LP EGR rate at the engine inlet by the expression $$\hat{Q}_{air\_mot}=(1-\hat{\tau}_{EGR\_BP\_mot}) \cdot Q^{mot}.$$

* * * * *